US012459780B2

(12) United States Patent
Bitzi

(10) Patent No.: US 12,459,780 B2
(45) Date of Patent: Nov. 4, 2025

(54) METHOD AND SYSTEM FOR DETERMINING THE POSITION OF AN ELEVATOR CAR OF AN ELEVATOR INSTALLATION

(71) Applicant: Inventio AG, Hergiswil (CH)

(72) Inventor: Raphael Bitzi, Lucerne (CH)

(73) Assignee: INVENTIO AG, Hergiswil (CH)

( * ) Notice: Subject to any disclaimer, the term of this patent is extended or adjusted under 35 U.S.C. 154(b) by 1346 days.

(21) Appl. No.: 15/733,714

(22) PCT Filed: Jun. 11, 2019

(86) PCT No.: PCT/EP2019/065181
§ 371 (c)(1),
(2) Date: Oct. 2, 2020

(87) PCT Pub. No.: WO2020/001971
PCT Pub. Date: Jan. 2, 2020

(65) Prior Publication Data

US 2022/0127109 A1 Apr. 28, 2022

(30) Foreign Application Priority Data

Jun. 27, 2018 (EP) .................................... 18180204

(51) Int. Cl.
*B66B 1/34* (2006.01)

(52) U.S. Cl.
CPC .................................. *B66B 1/3492* (2013.01)

(58) Field of Classification Search
CPC .................................................... B66B 1/3492
USPC .......................................................... 187/394
See application file for complete search history.

(56) References Cited

U.S. PATENT DOCUMENTS

| | | | | |
|---|---|---|---|---|
| 6,612,403 | B2 * | 9/2003 | Silberhorn | B66B 1/3492 187/394 |
| 10,549,947 | B2 | 2/2020 | Sonnenmoser et al. | |
| 10,577,220 | B2 | 3/2020 | Bitzi et al. | |
| 10,696,522 | B2 | 6/2020 | Bitzi et al. | |

(Continued)

FOREIGN PATENT DOCUMENTS

| | | | | |
|---|---|---|---|---|
| CN | 1989060 A | * | 6/2007 | B66B 1/3492 |
| CN | 107000964 A | * | 8/2017 | B66B 3/02 |

(Continued)

*Primary Examiner* — Christina M Schreiber
(74) *Attorney, Agent, or Firm* — Shumaker, Loop & Kendrick, LLP

(57) ABSTRACT

A method and system for determining the position of an elevator car movable in a shaft of an elevator installation capture images of shaft components and/or shaft equipment serving other functions using an image capture unit on the car. A current image is compared with at least one stored comparison image of the components and/or equipment in a travel direction of the car to determine a current position of the car in the travel direction. If there is no information regarding the position of the car from a previous determination step, for example if the elevator installation is restarted, a current image is compared with all the stored comparison images. Based upon this comparison, one possible position or a plurality of possible positions of the car are determined. These possible positions are checked at least once before one of these positions is adopted as the current position of the car.

15 Claims, 2 Drawing Sheets

(56) References Cited

U.S. PATENT DOCUMENTS

| | | | | |
|---|---|---|---|---|
| 2001/0025746 | A1* | 10/2001 | Bammert | B66B 1/3492 187/394 |
| 2015/0307319 | A1* | 10/2015 | Michel | B66B 5/16 700/275 |
| 2017/0341910 | A1* | 11/2017 | Bitzi | B66B 9/00 |
| 2017/0349399 | A1* | 12/2017 | Sonnenmoser | B66B 5/0031 |
| 2017/0349400 | A1* | 12/2017 | Bitzi | B66B 1/30 |
| 2020/0115188 | A1* | 4/2020 | Bitzi | G06T 7/74 |
| 2022/0127109 | A1* | 4/2022 | Bitzi | B66B 1/3492 |

FOREIGN PATENT DOCUMENTS

| | | | | |
|---|---|---|---|---|
| CN | 108178031 | A * | 6/2018 | B66B 1/06 |
| EP | 1178001 | A1 * | 2/2002 | B66B 1/50 |
| EP | 1232988 | A1 * | 8/2002 | B66B 1/3492 |
| EP | 1232988 | B1 * | 7/2004 | B66B 1/3492 |
| WO | WO-2006073015 | A1 * | 7/2006 | G01P 3/36 |
| WO | WO-2016087528 | A1 * | 6/2016 | B66B 3/02 |
| WO | WO-2016096697 | A1 * | 6/2016 | B66B 1/3492 |
| WO | WO-2016096698 | A1 * | 6/2016 | B66B 7/022 |
| WO | WO-2016096824 | A1 * | 6/2016 | B66B 1/3492 |
| WO | WO-2018210627 | A1 * | 11/2018 | G06T 7/74 |

* cited by examiner

METHOD AND SYSTEM FOR DETERMINING THE POSITION OF AN ELEVATOR CAR OF AN ELEVATOR INSTALLATION

FIELD

The invention relates to a method for determining the position of an elevator car, which is arranged so as to be movable in an elevator shaft, of an elevator installation and to a system for determining the position of an elevator car, which is arranged so as to be movable in an elevator shaft, of an elevator installation.

BACKGROUND

EP 1 232 988 A1 describes a method and a system for determining the position of an elevator car, which is arranged so as to be movable in an elevator shaft, of an elevator installation. For this purpose, an image capture unit arranged on the elevator car captures image data of a guide rail in the elevator shaft, which rail is considered as shaft equipment, and transmits said data to a computing unit. The computing unit extracts a one-dimensional image in the form of an image vector oriented in the direction of travel of the elevator car from the image data from the image capture unit. This current image is compared in the direction of travel with a stored image in the form of a one-dimensional comparison image vector oriented in the direction of travel, each stored image being associated with a position of the elevator car in the elevator shaft. The position of the elevator car in the direction of travel in the elevator shaft can be determined from the comparison of the two image vectors. In normal operation, the determination of the position of the elevator car is based on the knowledge of the position at a previous determination time. If this previous position is not known, for example after a restart of the system or the entire elevator installation, the determination of the position of the elevator car has to be determined independently of the previous position of the elevator car. For this purpose, the current image is compared with all the stored images and the stored image with which there is the greatest match is determined and thus determines the position of the elevator car. A comparison of the current image with a stored image cannot provide an absolute result regarding the matching of the two images, but only a measure of the matching of the images. The determination of the position of the elevator car carried out in this way is therefore associated with a particular degree of uncertainty.

SUMMARY

In contrast, it is in particular the object of the invention to propose a method and a system for determining the position of an elevator car of an elevator installation which allow a reliable determination of the position of the elevator car without knowledge of a previous position of the elevator car.

In the method according to the invention for determining the position of an elevator car, which is arranged so as to be movable in an elevator shaft, of an elevator installation, images of shaft components or shaft equipment serving other functions are taken using an image capture unit arranged on the elevator car. A current image is compared with at least one stored comparison image of the above-mentioned shaft components or shaft equipment in a direction of travel of the elevator car in order to determine a current position of the elevator car in the direction of travel.

The method has a start phase, a review phase and a decision phase, with at least one method step being carried out in each phase. The review phase and the decision phase can be carried out several times in succession.

The method begins in the start phase, in which the following steps are carried out in particular in the order specified:

- taking a start image when the elevator car is stationary at an unknown start position in the elevator shaft,
- determining a start comparison characteristic value for every possible position of the elevator car in the direction of travel, which value indicates a measure for a match of the start image with the comparison image of the particular position,
- determining a start assumption position of the elevator car on the basis of the start comparison characteristic values and a start evaluation criterion.

After the start phase or a previous decision phase has been completed, the following steps are carried out in the review phase, in particular in the order specified:

- moving the elevator car along a review travel path to a review position in the elevator shaft,
- taking a review image at the review position of the elevator car in the elevator shaft,
- determining a review assumption position of the elevator car from the previous assumption position of the elevator car and the review travel path,
- determining a review comparison characteristic value for the review assumption position of the elevator car, the review comparison characteristic value indicating a measure for a match of the review image and with the comparison image of the review assumption position.

After a review phase has been completed, a decision is made in the decision phase, on the basis of the review comparison characteristic value, as to whether

- the review assumption position is determined as the current position of the elevator car,
- a further review phase and a further decision phase is carried out or
- the review assumption position is excluded as the current position of the elevator car.

In the method according to the invention, the position of the elevator car is therefore not determined by a one-time comparison of a current image with all the comparison images, but a position recognized as a possible position, a so-called start assumption position, is reviewed at least once, possibly several times, before a so-called review assumption position resulting from the start assumption position is determined as the actual position of the elevator car. Thus, despite the described property of an image comparison that an absolute result cannot be provided, the position of the elevator car can be determined in a very dependable and thus reliable manner. Since the precise knowledge of the position of the elevator car in the elevator shaft is absolutely necessary for reliable operation of an elevator installation, such reliable operation of the elevator installation can be ensured even after a restart of the system for determining the position of the elevator car or the entire elevator installation.

The method according to the invention is carried out only when there is no information regarding the position of the elevator car in the elevator shaft. It is therefore carried out in a so-called initialization operation. Once the position has been reliably determined, there is a switch into a normal operation, in which the position is determined on the basis of the knowledge of the position at a previous determination time. In the normal operation, the position can be determined, for example, using the method according to EP 1 232

988 A1 or a method according to the applicant's international patent application having application number PCT/EP2018/061850, which has been published as WO 2018/210627 A1 and US 2020/0115188 A1.

The method is carried out in particular by a computing unit which, in particular, is arranged on the elevator car like the image capture unit and is in communication with an elevator control of the elevator installation.

The elevator shaft of an elevator installation is usually oriented in the vertical direction, so that the direction of travel of the elevator car in the elevator shaft extends in the vertical direction, with small deviations. In this case, a direction transverse to the direction of travel of the elevator car extends in the horizontal direction. Said position in the direction of travel of the elevator car can thus be understood to mean the vertical position of the elevator car or the height of the elevator car in the elevator shaft. For the sake of simplicity, it is assumed in the following that the direction of travel extends in the vertical direction as described. However, this does not preclude the direction of travel being inclined or horizontal at least in portions. The direction of travel is also referred to below as the z direction and the direction transverse to the direction of travel is referred to as the x direction.

The position of the elevator car in the direction of travel is required by the elevator control of the elevator installation in order to be able to move and position the elevator car reliably and precisely within the elevator shaft. The speed and possibly also the acceleration of the elevator car can be determined by a temporal observation of the course of the position in the direction of travel. These variables are also used in particular by the elevator control. The speed and/or the acceleration of the elevator car can be determined in particular by said computing unit, but also by the elevator control.

The elevator car is connected in particular via a suspension means in the form of a rope or a belt to a drive machine. The drive machine can thus move the elevator car in the elevator shaft. The elevator car can also have a drive arranged on the elevator car, for example in the form of a friction wheel drive or a linear motor, and can thus move independently of a suspension means in the elevator shaft. It is also possible for more than one elevator car to be moved or move independently of one another in an elevator shaft.

The image capture unit in particular takes images that are made up of individual pixels. It is in particular designed as a digital camera, for example in the form of a so-called CCD or CMOS camera. For example, the camera has a resolution of 700-800 pixels (lines) by 400-600 pixels (columns). The image capture unit can also be designed as another image capturing system that can image and display a surface structure. It can also be designed, for example, as an infrared camera, scanner, X-ray imaging device or ultrasound imaging system. It would also be sufficient if the image capture unit captured only one column.

Each of said pixels is associated with a so-called pixel value by the image capture unit, which value in particular represents a measure of the brightness value of the surface section of the captured object associated with this pixel. The pixel value can, for example, be coded with 8 bits, that is to assume a total of 256 different values.

The image capture unit is in particular arranged such that the columns extend in the direction of travel (z direction) of the elevator car and the lines extend transversely to the direction of travel (x direction) of the elevator car. The image capture unit is arranged on the elevator car in such a way that it can take images of shaft components or shaft equipment serving other functions. "Shaft components" are to be understood here to mean parts of the elevator shaft which are available for other purposes, for example shaft walls. "Shaft equipment" is to be understood here to mean parts which are mounted in the elevator shaft when the elevator installation is being assembled, for example guide rails for guiding the elevator car. Said shaft components and shaft equipment are not primarily installed or mounted to allow the position of the elevator car to be determined, but serve another purpose, for example in the case of a shaft wall, to form the elevator shaft or, in the case of a guide rail, to guide the elevator car.

The one or more stored comparison images with which a current image is compared are also taken by the image capture unit in a so-called training run and then stored in a memory by the computing unit. In particular, only a section of an image that is taken is stored as a comparison image. The comparison images can in particular overlap or also overlap twice in the direction of travel. In particular, they overlap in such a way that, in each case, one comparison image abuts the next-but-one comparison image. In order to derive a comparison image from a current image from the image capture unit during the training run, the current image can be post-processed.

In the start phase, the so-called start image, i.e. a current image when the elevator car is stationary, is first taken at the start position. This start image is compared with all the stored comparison images, each comparison image being associated with a specific position. In this comparison, a so-called start comparison path is determined for every possible position of the elevator car, i.e. over an entire possible travel range of the elevator car. Two adjacent possible positions are shifted with respect to one other, for example, by a distance that corresponds to a pixel in the current image or a comparison image. The start comparison path is a measure for a match of the start image with the comparison image of the particular position.

To determine the start comparison path, the current image is compared on a pixel-by-pixel basis, i.e. the pixel values of two pixels lying one above the other, with the particular comparison image. In particular, when comparing the two images, the comparison image consisting of a section of a previously taken image is shifted on a pixel-by-pixel basis in the direction of travel (z direction) with respect to the current image and a comparison of the comparison image and the selected section of the current image is carried out in each case. The selected section of the current image is also referred to below as the image below the comparison image or the image therebelow. Each position of the comparison image relative to the current image corresponds to a position of the elevator car in the elevator shaft. The position of the elevator car thus results from the information as to from which point in the elevator shaft the comparison image originates and the position of the comparison image in the current image. The position that is associated with a comparison image thus also results from these two pieces of information.

The so-called sum of the square distances, the so-called global linear cross-correlation, the normalized cross-correlation or a comparable parameter, for example, can be used as the start comparison path. When calculating the sum of the square distances, the squares of the difference of the pixel values of the superimposed pixels of the comparison image and the image therebelow are added up. The smaller said sum, the greater the similarity of the comparison image and the image currently therebelow. When calculating the global linear cross-correlation, the products of the pixel values of the superimposed pixels of the comparison image and the image therebelow are added up. When calculating the normalized cross-correlation, the result of the above-mentioned global linear cross-correlation is normalized. For this purpose, the root of the sum of the squares of the pixel values of the comparison image and the root of the sum of the squares of the pixel values of the image therebelow are calculated. To calculate the normalized cross-correlation, the result of the above-mentioned global linear cross-correlation is divided by the product of the two roots mentioned. The greater the result of the normalized cross-correlation, the greater the similarity of the comparison image and the image therebelow.

At the end of the start phase, it is checked whether at least one start comparison characteristic value fulfills a start evaluation criterion. If this is not the case, the method for determining the position of the elevator car is terminated. In this case, for example, the elevator car can be moved a little and the method can be started again.

It is further assumed that at least one start assumption position was determined on the basis of the start comparison characteristic values and a start evaluation criterion. The start evaluation criterion can consist, for example, in that the start comparison characteristic value of a start assumption position must be greater or smaller than a first threshold value, depending on the type of the start comparison characteristic value. If the start comparison characteristic value has been determined on the basis of a normalized cross-correlation, then it must be greater than the first threshold value in order to fulfill the start evaluation criterion. This is assumed in the following. It may be the case that one or more start assumption positions fulfill the start selection criterion. In the case of a plurality of start assumption positions, the following method steps are carried out accordingly for each start assumption position.

At the beginning of the review phase, the elevator car is moved along a review travel path to a review position, a direction of movement and the length of the review travel path being known. The direction of movement and the length of the review travel path can be determined, for example, by the elevator control from the actuation of the drive machine. It is also possible that a shift of the review image with respect to the start image is determined and, from this, the direction of movement and the length of the review travel path are determined. This type of position determination is referred to below as relative position determination and is described in more detail. The review travel path is, for example, between 2 and 10 cm.

According to the method of the elevator car, a review assumption position is determined on the basis of the previous assumption position and the review travel path. If the review phase is carried out after the start phase, i.e. for the first time after the start of the method, said previous assumption position corresponds to the start assumption position. If the review phase is carried out after a decision phase, i.e. once again after the start of the method, said previous assumption position corresponds to the review assumption position of the previous review phase. In other words, the review assumption position corresponds to the position at which the elevator car would have to be if the start assumption position or the review assumption position of the previous review phase corresponded to the actual position of the elevator car.

According to the described method of the elevator car, a review image, i.e. a current image, is taken at the review position of the elevator car. A review comparison characteristic value is then determined for the review assumption position of the elevator car, the review comparison characteristic value indicating a measure for a match of the review image and with the comparison image of the review assumption position. The review image is therefore compared with the comparison image of the review assumption position. In this way, it is checked, more or less, whether the review assumption position corresponds to the review position, i.e. the actual position of the elevator car. The review comparison characteristic value is determined in particular in the same way as the start comparison characteristic values in the start phase. However, it is also possible for another method to be used to determine the review comparison characteristic value.

The review comparison characteristic value is determined in particular only for the review assumption position or for a small region around the review assumption position. It is also possible, however, for review comparison characteristic values to be determined for all positions of the entire travel path and for only the review comparison characteristic value of the review assumption position or a small region around the review assumption position to be evaluated.

It is possible for a plurality of assumption positions to have been determined in the previous phase, i.e. more than one position of the elevator car would be possible on the basis of the tests carried out. In this case, a review comparison characteristic value is determined, as described, for each review assumption position resulting from the plurality of assumption positions.

After the determination of the review comparison characteristic value or the review comparison characteristic values, a decision is made in the following decision phase, on the basis of the one or more review comparison characteristic values, as to how the method is continued.

As a first option, the review assumption position can be determined as the current position of the elevator car. In this case, the method has been successfully completed because the current position of the elevator car has been reliably determined. This option is selected in particular if a review comparison characteristic value fulfills a decision determination criterion and, optionally, other conditions are fulfilled. In other words, this option is selected if it has been confirmed in one or more review and decision phases that a start assumption position determined in the start phase has matched with the actual start position of the elevator car. A review comparison characteristic value fulfills, for example, the decision determination criterion if it is greater or less than a second threshold value, which can be the same as or different from the above-mentioned first threshold value of the start evaluation criterion.

As a further condition for the selection of the first option, it can in particular be checked whether only a single review comparison characteristic value fulfills the decision determination criterion. The determination of the position of the elevator car is therefore particularly reliable.

As a further, second option for the decision in the decision phase, it can be decided to carry out a further review phase and a further decision phase. This option is selected in particular if one review comparison characteristic value or a plurality of review comparison characteristic values fulfill a repetition evaluation criterion but no review comparison characteristic value fulfills the above-mentioned decision determination criterion. A review comparison characteristic value fulfills, for example, a repetition evaluation criterion if it is greater than a third and smaller than the above-mentioned second threshold value. The second option is also selected in particular if a plurality of review assumption positions fulfill said decision determination criterion or a review assumption position fulfills said decision determination criterion but one of the other conditions mentioned is not fulfilled. In other words, this option is selected if more than one review assumption position is considered as the actual position of the elevator car or if a review assumption position is still possible as an actual position, but a further review is necessary.

The further review phase can in particular be carried out in the same way as the previous review phase. However, it is also possible for a different review travel path or a different method to be used to determine the review comparison characteristic value. In particular, the further decision phase can also be carried out in the same way as the previous decision phase. However, it is also possible for other evaluation criteria or conditions to be used.

As a further, third option for the decision, it can be decided to exclude a review assumption position as the current position of the elevator car. This is the case in particular if neither of the two other options can be selected or if a termination condition is fulfilled. If the excluded review assumption position is the only review assumption position still under consideration, the method is ended. In other words, a review assumption position is excluded if the assumption that a start assumption position determined in the start phase has matched the actual start position of the elevator car has proven to be incorrect.

After the method has been terminated, the elevator car can be moved a short distance and the method can be started again.

In one embodiment of the invention, the review assumption position is determined as the current position of the elevator car in the decision phase only if at least one additional decision criterion that is independent of the review comparison characteristic value is fulfilled. This ensures that the position of the elevator car is correctly determined.

As a decision criterion, it is checked in particular whether a travel path between the start position and the current review assumption position is greater than a definable minimum travel path. The minimum travel path can be, for example, between 5 and 15 cm. This can effectively prevent striking features which extend in the direction of travel, such as a guide rail scratch extending in the direction of travel, negatively influencing the determination of the position of the elevator car. The described procedure makes it possible to avoid only current images on which said feature is contained being used.

The minimum travel path is selected in particular such that it is greater than the length of a so-called rail clip in the direction of travel. The rail clips are used to secure guide rails from which the images are taken to determine the position of the elevator car, and so the rail clips are also included in the images. The rail clips have an edge extending in the direction of travel, which can negatively influence the described image comparison. If such an edge is contained on the current image and the comparison image, the images may be incorrectly regarded as being very similar, since the similarity of said edges can conceal differences in the remaining parts of the images. The aforementioned choice of the minimum travel path can ensure that current images without rail clips are also used to determine the position of the elevator car.

In one embodiment of the invention, the determination of the position of the elevator car is terminated if a termination criterion is fulfilled. In other words, the execution of the method according to the invention is terminated as soon as said termination criterion is fulfilled. Since the elevator car is moved during the review phase, this can effectively prevent the elevator car from inadvertently reaching the limits of the permissible travel range.

As a termination criterion, it is checked in particular whether an entire travel path of the elevator car, starting from the start position, has exceeded a maximum travel path. This can particularly effectively prevent the elevator car from inadvertently reaching the limits of the permissible travel range. The entire travel path is understood to mean the path between the start position of the elevator car in the start phase and the review position in the last review phase. If the elevator car is always moved in the same direction during the review phases, the entire travel path corresponds to the sum of the individual review travel paths. The maximum travel path is, for example, between 15 and 30 cm.

In one embodiment of the invention, the determination of the position of the elevator car is restarted after a termination, the elevator car being moved in the opposite direction in the review phase compared with the review phase before the termination. The method in the opposite direction can reliably prevent the elevator car from reaching a limit of the permissible travel range in the subsequent review phases. In particular, at least one review travel path in a review phase, in particular in the first review phase, is selected to be different from the review travel paths before the restart. This ensures that, compared with the attempt before the restart, other review positions are approached and therefore the chances of a successful determination of the current position of the elevator car are particularly high.

In one embodiment of the invention, in the review phase, review comparison characteristic values are determined for a region around the review assumption position of the elevator car. The position which belongs to the review comparison characteristic value which indicates the greatest match is then used as the review assumption position for the subsequent decision phase. The position of the elevator car can thus be determined particularly precisely, since any inaccuracies in the determination of the review travel path and thus the review assumption position are compensated for.

Said region can extend, for example, 1-5 mm up and down around the review assumption position. A review comparison characteristic value is then determined for all possible positions in this region. Subsequently, for example, the largest of these review comparison characteristic values is determined and used as a review comparison characteristic value for the subsequent decision phase. In addition, the position of this largest review comparison characteristic value is adopted as the current review assumption position.

In one embodiment of the invention, the current image is also compared with the stored comparison image transversely to the direction of travel in order to determine the current position of the elevator car in the direction of travel. The position of the elevator car can thus be determined particularly robustly. Such a method is described in the applicant's international patent application having the application number PCT/EP2018/061850, which has been referenced above.

In other words, the position of the elevator car in the direction of travel in the elevator shaft can thus be reliably identified even if the elevator car is not always moved absolutely exactly along an identical travel curve in the elevator shaft, i.e. there may be different deviations of the travel curve transversely to the direction of travel. Although the elevator car is guided by a combination of a guide device arranged on the elevator car, for example in the form of guide shoes and guide rails secured to shaft walls of the elevator shaft, this guidance always has a little play, which results in slightly different travel curves within the elevator shaft, in particular when the elevator car is loaded differently. This then means that, on different journeys, the image capture unit does not always capture exactly the same sections of the shaft components or shaft equipment with respect to the direction transverse to the direction of travel. Since the surface structure of the shaft components or shaft equipment captured in said images changes or at least can change not only in the direction of travel, but also transversely to the direction of travel, the combination of a comparison in and transverse to the direction of travel can also be used to reliably determine the position of the elevator car even if different travel curves are described.

A comparison transverse to the direction of travel is to be understood, analogously to a comparison in the direction of travel, to mean that the current image or at least a part thereof and the comparison image or at least a part thereof are shifted with respect to one another on a pixel-by-pixel basis, transversely to the travel direction, and compared. The current image and/or the comparison image extend in the direction of travel and transversely to the direction of travel, i.e. they have a plurality of adjacent pixels both in the direction of travel and transversely to the direction of travel.

In one embodiment of the invention, the start image is also compared with the comparison image transversely to the direction of travel in order to determine the start comparison characteristic values. The comparison characteristic value which indicates the greatest match of the start image with the comparison image of a position is then used as the start comparison characteristic value of the particular position. When determining the start comparison values, analogously to the above description, slight deviations in the position of the elevator car transversely to the direction of travel can be compensated for, which allows a particularly robust determination of the start comparison characteristic values and thus also the position of the elevator car.

In one embodiment of the invention, in order to determine the review comparison characteristic value, the review image is also compared with the comparison image transversely to the direction of travel. The comparison characteristic value which indicates the greatest match is then used as the review comparison characteristic value for the subsequent decision phase. When determining the review comparison characteristic values, analogously to the above description, slight deviations in the position of the elevator car transversely to the direction of travel can be compensated for, which allows a particularly robust determination of the review comparison characteristic values and thus also the position of the elevator car.

In one embodiment of the invention, the elevator car is moved at a lower speed in the review phase in comparison with a normal operation of the elevator installation. This makes it particularly unlikely that dangerous situations will arise when the method is being carried out. Said lower speed mentioned can be, for example, between 10 and 20% of the speed of the elevator car in the normal operation.

In one embodiment of the invention, further information that can be acquired in the elevator shaft is evaluated to determine the position of the elevator car. The position of the elevator car can thus be determined particularly reliably. Further information that can be acquired in the elevator shaft is to be understood here to mean information that is required for the operation of the elevator installation, but is normally not used for determining the position of the elevator car. This includes, for example, the detection of an expert who is arranged in the vicinity of a floor and assists with the exact positioning of the elevator car on a floor. If such an expert is identified, for example by means of a special sensor, all review assumption positions that are not in a possible region of such an expert can be excluded. In addition, further information can also be evaluated, which can also be transmitted, for example, from the elevator control to the computing unit carrying out the method.

The above-mentioned object is also achieved by a system for determining the position of an elevator car, which is arranged so as to be movable in an elevator shaft, of an elevator installation, which has a computing unit and an image capture unit. The image capture unit is arranged on the elevator car and is designed to take images, consisting of individual pixels, of shaft components or shaft equipment serving other functions and to transmit them to the computing unit. The computing unit is designed to compare a current image with at least one stored comparison image of said shaft components or shaft equipment in a direction of travel of the elevator car in order to determine a current position of the elevator car in the direction of travel. According to the invention, the computing unit is designed to carry out the following directly or indirectly:

a start phase having the following steps
- taking a start image when the elevator car is stationary at an unknown start position in the elevator shaft,
- determining a start comparison characteristic value for every possible position of the elevator car in the direction of travel, which value indicates a measure for a match of the start image with the comparison image of the particular position,
- determining a start assumption position of the elevator car on the basis of the start comparison characteristic values and a start evaluation criterion, a review phase having the following steps
- moving the elevator car along a review travel path to a review position in the elevator shaft,
- taking a review image at the review position of the elevator car in the elevator shaft when the elevator car is stationary,
- determining a review assumption position of the elevator car from the previous assumption position of the elevator car and the review travel path,
- determining a review comparison characteristic value for the review assumption position of the elevator car, the review comparison characteristic value indicating a measure for a match of the review image and with the comparison image of the review assumption position, and a decision phase in which a decision is made, on the basis of the review comparison characteristic value, whether to
- determine the review assumption position as the current position of the elevator car,
- carry out a further review phase and a further decision phase or
- exclude the review assumption position as the current position of the elevator car.

"Indirect carrying out" by the computing unit is understood to mean that the computing unit actuates another component of the system for determining the position of an elevator car in such a way that the desired result is achieved.

The described embodiments of the invention relate equally to the method and the system for determining the position of an elevator car. In other words, the method steps described can also be implemented as features of the system.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
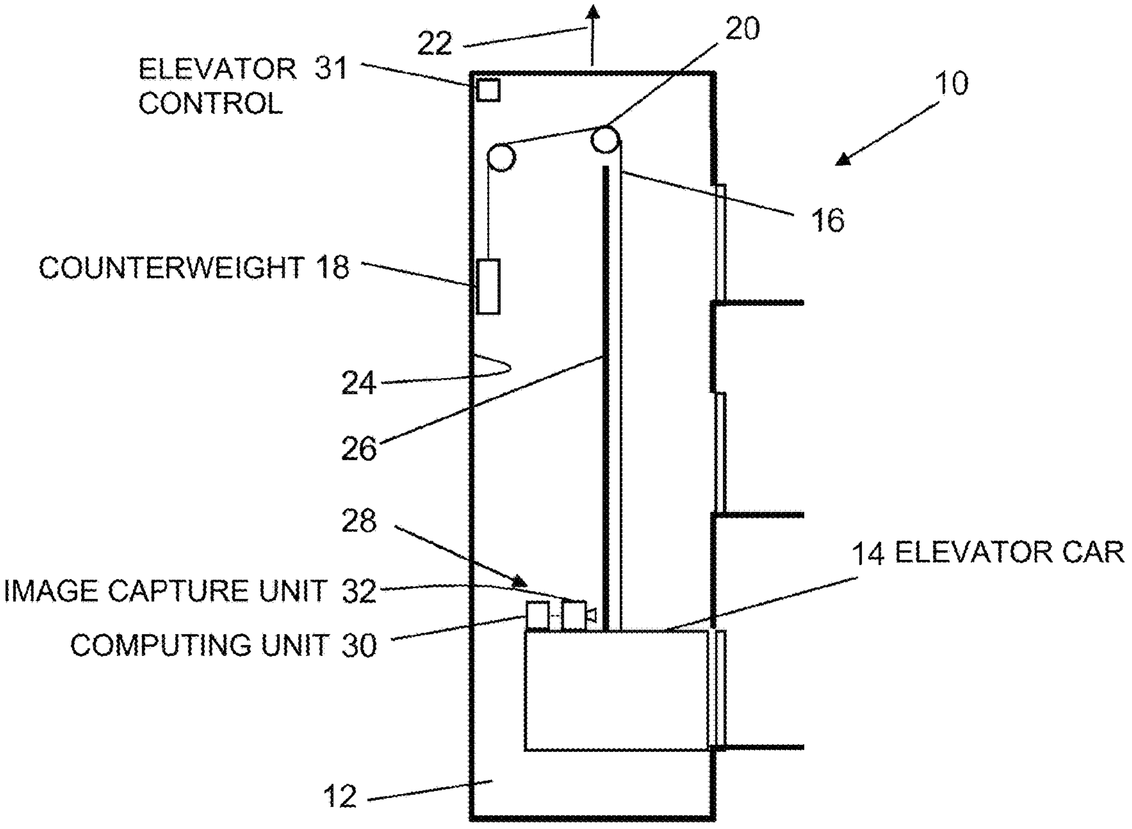
FIG. 1 schematically shows an elevator installation having a system for determining the position of an elevator car that is arranged so as to be movable in an elevator shaft.

According to FIG. 1, an elevator installation 10 has an elevator shaft 12 oriented in the vertical direction. Arranged within the elevator shaft 12 is an elevator car 14, which is connected via a suspension means 16 in the form of a flexible belt or a rope to a counterweight 18 in a known manner. The suspension means 16 extends from the elevator car 14 via a drive pulley 20, which can be driven by a drive machine (not shown). The elevator car 14 can be moved up and down in the elevator shaft 12 by means of the drive machine and the suspension means 16. The elevator car 14 can thus be moved in or counter to a direction of travel 22, which extends upward in the vertical direction, in the elevator shaft 12.

A guide rail 26 which extends in the direction of travel 22 is secured to a shaft wall 24 of the elevator shaft 12. The shaft wall 24 can be referred to as a shaft component and the guide rail 26 as shaft equipment. When the elevator car 14 is moved, it is guided along the guide rail 26 via guide shoes (not shown).

A system 28 for determining the position of the elevator car 14 is arranged on the elevator car 14. The system 28 has a computing unit 30 and an image capture unit 32. The image capture unit 32, which is designed as a digital camera, is oriented in such a way that it can capture images of the guide rail 26. It transmits the images of the guide rail 26, which consist of individual pixels, to the computing unit 30, which compares a current image with at least one stored comparison image of the guide rail 26 in order to determine a current position of the elevator car 14 in the direction of travel 22. The computing unit 30 transmits the current position of the elevator car 14 via a signal connection (not shown) to an elevator control 31 arranged in the elevator shaft 12, which control uses the position of the elevator car 14 to control the elevator installation 10.

The computing unit 30 does not have to be arranged on the elevator car. It can also be arranged so as to be stationary in the elevator shaft and so as to be in signal communication with the image capture unit 32. The image capture unit could also take images of the shaft wall and transmit them to the computing unit.

Figure 2:
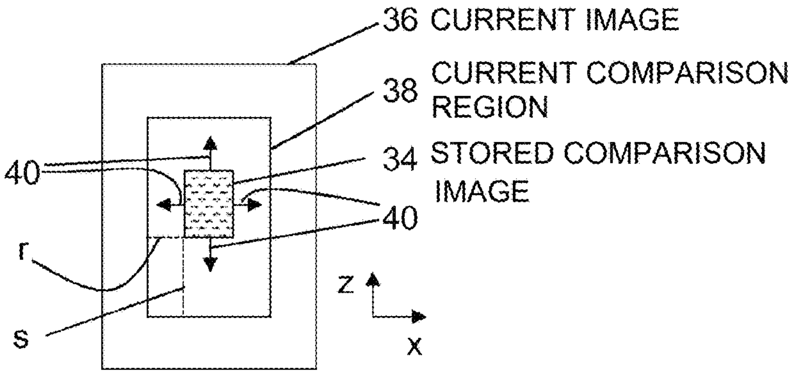
FIG. 2 shows a comparison image within a current comparison region of a current image of shaft equipment of the elevator shaft.

To determine the current position of the elevator car 14 in the elevator shaft 12, the computing unit 30 compares a stored comparison image 34 shown in FIG. 2 with a current image 36 from the image capture unit 32.

Comparison images for a so-called relative and so-called absolute position determination are stored in a memory (not shown) of the computing unit 30. A large number of comparison images 34 are stored for the absolute position determination. When the system 28 is started up, these comparison images 34 are derived from current images from the image capture unit 32 and stored during a so-called training run. During the training run, the elevator car 14 is moved with the system 28 along the entire travel path of the elevator car 14 in the elevator shaft 12. The computing unit 30 derives individual comparison images 34 from the images taken by the image capture unit 32 and associates them with a position in the elevator shaft 12. The computing unit 30 derives the comparison images 34 in such a way that they overlap each other twice. In particular, they overlap in such a way that, in each case, one comparison image abuts the next-but-one comparison image. The stored comparison images 34 thus cover the entire travel path of the elevator car 14. As soon as a comparison image 34 is identified in a current image 36 from the image capture unit 32, the position of the elevator car 14 in the direction of travel 22 can be inferred with the help of the position of the comparison image 34 in the elevator shaft 12 which is likewise stored. The comparison images are selected on the basis of the position of the elevator car 14 at a previous determination time and the speed of the elevator car 14. This severely limits the number of comparison images required for the comparison.

In order to derive a comparison image 34 from a current image from the image capture unit 32 during the training run, the current image is post-processed by the computing unit 30. For this purpose, the computing unit 30 first selects a section in the center of the current image. The computing unit 30 then calculates the mean value of all the pixel values of the selected section and subtracts the calculated mean value from each pixel value. The result of this post-processing is saved as the comparison image 34. Additional post-processing, such as low- and/or high-pass filtering, can also be carried out.

In addition, the computing unit 30 determines a structure parameter for each post-processed and stored comparison image 34 and stores this together with the comparison image 34. The computing unit 30 starts from an image post-processed as described above. It squares the pixel values of all pixels and adds them up. The result of this summation or also the root thereof is stored together with the comparison image 34.

The comparison image for the relative position determination is derived from an image from the image capture unit 32 from the previous position determination. In the relative position determination, the current image is compared with an image captured during a previous position determination, with a shift of the current image relative to the image from the previous position determination in the direction of travel being determined in said comparison of the images. The current position of the elevator car can be determined from said shift and the position determined during the previous position determination. Even if the absolute position is not known in the previous position determination, the travel path covered and the direction can be determined from said shift.

In order to determine the position of the elevator car 14 in the direction of travel 22 during the normal operation of the elevator installation 10, the computing unit 30 compares a comparison image 34 with a current image 36 from the image capture unit 32 both in and transversely to the direction of travel 22. For this purpose, the computing unit 30 checks whether a comparison image 34 is contained in a current comparison region 38 of the current image 36. If this is the case, the position of the comparison image 34 in the current comparison region 38 is determined at the same time. In the following it is assumed that the comparison image 34 is contained in the current comparison region 38.

In order to determine the position of the comparison image 34 in the current comparison region 38, the computing unit 30 compares the comparison image 34 and the current comparison region 38 of the current image 36 both in the direction of travel (z direction) and transversely to the direction of travel (x direction). For this purpose, the comparison image 34 is shifted on a pixel-by-pixel basis both in the direction of travel (z direction) and transversely to the direction of travel (x direction) with respect to the current comparison region 38, and a comparison characteristic value is calculated for each position in the form of a correlation coefficient between the comparison image 34 and the image of the comparison region 38 below the comparison image 34. The comparison characteristic value in the form of the correlation coefficient is a measure of the match between the comparison image 34 and the current comparison region 38. The shift of the comparison image 34 is symbolized in FIG. 2 by the arrows 40.

The correlation coefficient is calculated using the following formula:

$$k(r,s)=\frac{\Sigma_{(i,j)\in R}(I(r+i,s+j)-\bar{I}(r,s))*(R(i,j)-\bar{R})}{\sqrt{\Sigma_{(i,j)\in R}(I(r+i,s+j)-\bar{I}(r,s))^2}*\sqrt{\Sigma_{(i,j)\in R}(R(i,j)-\bar{R})^2}}$$

where r=shift of the comparison image in the x direction,
s=shift of the comparison image in the z direction,
R(i,j)=pixel values of the comparison image in the x position i and the z position j,
I(r+i,s+j)=pixel values of the current comparison region at the x position r+i and the z position s+j;
$\bar{R}$=mean value of all pixel values of the comparison image,
$\bar{I}$(r,s)=mean value of all pixel values of the current comparison region below the comparison image shifted by r in the x direction and s in the z direction.

Since, prior to being stored by the computing unit 30, the comparison image 34 was post-processed such that the mean value of all pixel values of the comparison image 34 was subtracted from each pixel value, the term $$(R(i,j)-\bar{R})$$

no longer has to be evaluated during the calculation of the correlation coefficients, but rather it is possible to use the pixel values of the comparison image 34 directly.

In addition, as described above, a structure parameter of the comparison image 34 is also stored, which can be used directly for the calculation of the correlation coefficient. As described above, the following term is calculated as the structure parameter:

$$\sum_{(i,j)\in R}(R(i,j)-\bar{R})^2$$

and either the result or the root thereof is stored. The structural parameter is thus accounted for when comparing the current image 36 with the stored comparison image 34.

The correlation coefficient is calculated for every possible position of the comparison image 34 in the current comparison region 38, i.e. for every possible shift by r in the x direction and s in the z direction. The correlation coefficients for all possible r and s values result in a three-dimensional surface. The maximum correlation coefficient of the entire surface indicates the position of the comparison image 34 in the current comparison region 38 with the highest match. On the above-mentioned condition that the comparison image 34 is contained in the current comparison region 38, said maximum indicates the position of the comparison image 34 at which there is a match between the comparison image 34 and the image therebelow. As an additional check, it can be checked whether the maximum correlation value is greater than a threshold value. With the information regarding the position of the comparison image 34 in the current comparison region 38 of the current image 36, the position of the elevator car 14 in the elevator shaft 12 in the direction of travel 22 can be determined either via a relative or an absolute position determination.

Figure 3:
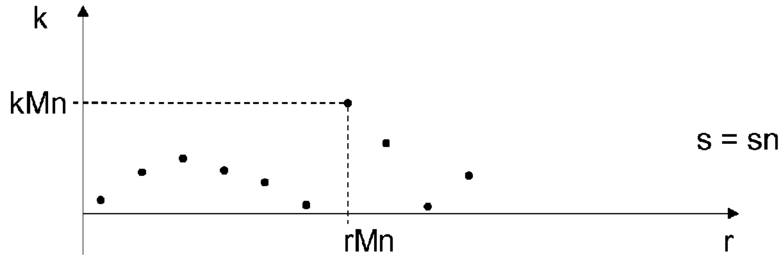
FIG. 3 shows correlation coefficients of a comparison image with an image therebelow of a current comparison region of a current image with different shifts transversely to a direction of travel (x direction) and a constant shift in the direction of travel (z direction) of the elevator car.

FIG. 3 shows, by way of example, the correlation coefficients on a k axis upward above the possible r values on an r axis to the right, i.e. the possible shifts in the x direction and a fixed s value, i.e. a constant shift in the z direction.

According to FIG. 3, the correlation coefficient reaches the maximum value kMn with an s value of sn and an r value of rMn. This means that the comparison image 34, with a fixed shift of sn in the z direction and with a shift by rMn in the x direction, has the greatest match with the image therebelow of the current comparison section 38 of the current image 36.

The computing unit 30 determines for each possible s-value s=sn the (local) maximum correlation coefficient kMn and the associated shift rMn in the x direction. The computing unit 30 then determines the maximum correlation value kMax of all determined (local) maximum correlation coefficients kMn, which represents the absolute maximum of the correlation coefficients and thus the three-dimensional surface described. The position of the comparison image 34 in the current comparison region 38 results from the associated s and r values of the absolute maximum of the correlation coefficient. The shift in the z direction and the position in the elevator shaft associated with the comparison image thus result in the position of the elevator car in the elevator shaft. A correlation coefficient can thus be associated with a position of the elevator car.

It is also possible for the comparison image to be shifted only in the z direction over the current image and for a correlation coefficient to be calculated in each case. In this case, the described determination of the maximum correlation coefficient for different shifts in the x direction, i.e. with different r values, is not required. The rest of the procedure remains otherwise the same.

After a restart of the system 28 for determining the position of the elevator car 14, the computing unit 30 has no information regarding the current position of the elevator car. The computing unit 30 then carries out a special method for the particularly reliable determination of the position of the elevator car 14, which is described below in connection with FIGS. 4*a*, 4*b* and 4*c*.

The method begins with a start phase in which the elevator car 14 is at an unknown start position 50. First, when the elevator car 14 is stationary, a start image (analogous to the current image 36 in FIG. 2) is taken using the image capture unit 32. A start comparison characteristic value in the form of an above-described cross-correlation coefficient is then determined for every possible position of the elevator car 14 in the direction of travel 22. For this purpose, a comparison is carried out with all stored comparison images (34 in FIG. 2), the comparison image being pushed over the start image in each case as described above. As described above, the shift can take place only in the z direction or in the z direction and x direction.

Figures 4A, 4B, 4C:
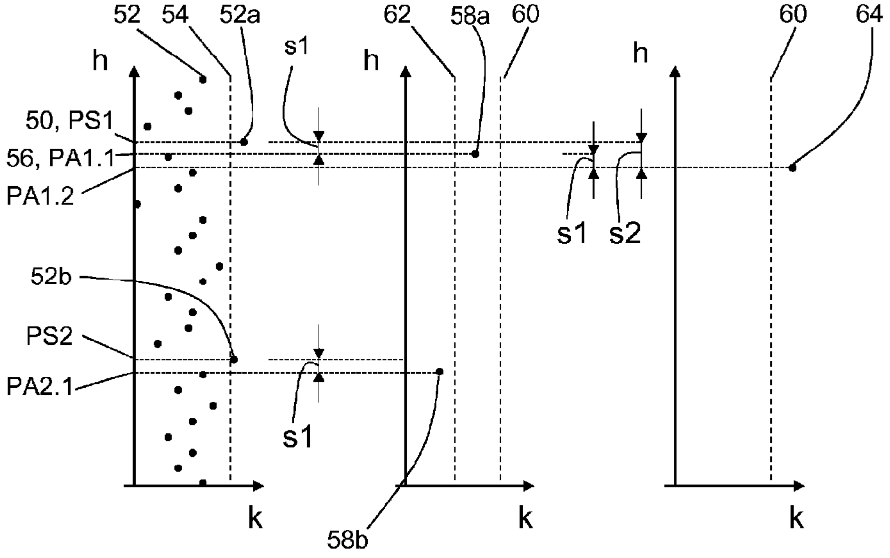
FIG. 4*a* shows start comparison characteristic values of a start image after completion of a start phase of a method for determining a position of an elevator car in an elevator shaft.
FIG. 4*b* shows review comparison characteristic values of two review assumption positions after completion of a first review phase following the start phase and FIG. 4*c* shows review comparison characteristic values of a review assumption position remaining after a first decision phase after completion of a second review phase following the decision phase.

The result of such a determination is shown very schematically in FIG. 4*a*. The associated cross-correlation coefficient is shown as point 52 (plotted along the k axis) for each of the different positions (plotted along the h axis). The larger the cross-correlation coefficient, the more similar the comparison image of this position is to the current image.

At the end of the start phase, it is checked which start comparison characteristic values fulfill a start evaluation criterion. As the start evaluation criterion, it is checked whether the start comparison characteristic values are greater than a first threshold value (shown as line 54 in FIG. 4*a*). In the example shown, this is the case for the start comparison characteristic values 52*a* and 52*b*. The positions belonging to these start comparison characteristic values 52*a*, 52*b* are referred to as the first start assumption position PS1 and the second start assumption position PS2.

If no start comparison characteristic value fulfills the start evaluation criterion, the method is terminated.

After the start phase has been completed, the elevator car 14 is moved downward along a review travel path s1 to a review position 56 in a subsequent review phase. The elevator car 14 is moved at a lower speed in comparison with a normal operation of the elevator installation. The situation after the elevator car is moved is shown in FIG. 4*b*. To move the elevator car 14, the computing unit 30 sends a corresponding request to the elevator control 31. The elevator control 31 can ensure adherence to the review travel path s1 by appropriately actuating the drive machine and, if necessary, by measuring the speeds of the drive machine. Alternatively or in addition, as described above, the relative position determination can be used to determine the review travel path s1. After the elevator car 14 has been moved, a review image (analogous to the current image 36 in FIG. 2) is taken at the review position 56.

From the two start assumption positions PS1, PS2, the review travel path s1 and the downward direction of travel, two review assumption positions PA1.1 and PA2.1 are determined, which are each shifted downward along the review travel path s1 relative to the start assumption positions PS1, PS2. For these two review assumption positions PA1.1, PA2.1, review comparison characteristic values are determined in the form of cross-correlation coefficients described above. For this purpose, the review image is compared with the comparison images of the review assumption positions PA1.1 and PA2.1 (comparable with 34 in FIG. 2). As described above, the images can be shifted with respect to one another only in the z direction or in the z direction and x direction. The two review comparison characteristic values 58*a*, 58*b* are shown in FIG. 4*b*.

In a subsequent decision phase, it is decided how the method should be continued. First, it is checked whether the two review comparison characteristic values 58*a*, 58*b* fulfill a decision determination criterion. For this purpose, it is checked whether they are greater than a second threshold value, which is shown as line 60 in FIG. 4*b*. In this example, the second threshold value is identical to the first threshold value of the start phase. Both review comparison characteristic values 58*a*, 58*b* are smaller than the second threshold value, so that at this point in time neither of the two review assumption positions PA1.1, PA2.1 is determined as the actual, current position of the elevator car 14.

It is then checked whether the two review comparison characteristic values 58*a*, 58*b* fulfill a repetition evaluation criterion. For this purpose, it is checked whether they are greater than a third threshold value, which is shown as line 62 in FIG. 4*b*. The third threshold value is smaller than the second threshold value. This is only the case for the review comparison characteristic value 58*a* of the first review assumption position PA1.1. The second review comparison characteristic value 58*b* of the second review assumption position PA2.1 is smaller than the third threshold value.

Since the first review comparison characteristic value 58*a* fulfills the repetition evaluation criterion, a further review phase and a further decision phase are carried out for the associated review assumption position PA1.1. Since the second review comparison characteristic value 58*b* also does not fulfill the repetition evaluation criterion, the associated review assumption position PA2.1 is excluded as a possible current position of the elevator car 14.

Finally, it is checked whether a termination criterion is fulfilled. If so, the method is terminated. For this purpose, it is checked whether an entire travel path of the elevator car 14, starting from the start position 50, has exceeded a maximum travel path. Since the elevator car 14 has only been moved along a review travel path s1 since the start of the method, the entire travel path corresponds to a review travel path s1 which is naturally smaller than the maximum travel path. The termination criterion is therefore not fulfilled and the method is continued.

If the method were to be terminated, it would be restarted, with the elevator car 14 being moved in the opposite direction in the review phase, i.e. upward, in comparison with the review phase before the termination. In particular, at least one review travel path in a review phase, in particular in the first review phase, is selected to be different from the review travel paths before the restart.

In the example described, the method is continued such that the first decision phase is followed by a further, second review phase. This runs analogously to the first review phase described above, with only one review assumption position PA1.2 resulting from the review assumption position PA1.1 and the review travel path s1. The resulting review comparison characteristic value 64 is shown in FIG. 4*c*.

In the following decision phase, it is decided again how the method should be continued. First of all, it is checked whether the review comparison characteristic value 64 fulfills the decision determination criterion. For this purpose, it is checked whether it is greater than the second threshold value, which is also shown as line 60 in FIG. 4*c*. The review comparison characteristic value 64 is greater than the second threshold value, meaning the decision determination criterion is fulfilled.

A decision criterion which is independent of the review comparison characteristic value 64 is then checked. For this purpose, it is checked whether a travel path s2 between the start position 50 and the current review assumption position PA1.2 is greater than a definable minimum travel path. This is the case here, meaning the review assumption position PA1.2 is determined as the actual, current position of the elevator car 14. This has confirmed the assumption that the first start assumption position PS1 corresponded to the start position 50 of the elevator car 14 in the start phase.

Instead of determining the review comparison characteristic values only for a review assumption position in the review phase, this can also be done for a region around the review assumption position of the elevator car. The position which belongs to the review comparison characteristic value which indicates the greatest match is then used as the review assumption position for the subsequent decision phase. The position for which the largest cross-correlation coefficient results is therefore used.

Further information that can be acquired in the elevator shaft can also be evaluated. For example, an expert (not shown) can be detected who is arranged in the vicinity of a floor and assists with the exact positioning of the elevator car on a floor. If such an expert is identified, for example by means of a special sensor, all review assumption positions that are not in a possible region of such an expert can be excluded.

Finally, it should be noted that terms such as "having," "comprising," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining the position of an elevator car, the elevator car being movable in an elevator shaft of an elevator installation by control of an elevator control, including operating a system capturing images of components and/or shaft equipment serving other functions in the elevator installation using an image capture unit arranged on the elevator car and comparing a current one of the images with at least one stored comparison image of the shaft components and/or shaft equipment in a direction of travel of the elevator car to determine a current position of the elevator car in the direction of travel, the method comprising the steps of:

the system performing a start phase including the steps of
- taking a start image with the image capture unit when the elevator car is stationary at an unknown start position in the elevator shaft,
- determining a start comparison characteristic value for every possible position of the elevator car in the direction of travel, the start comparison values indicating a measure for a match of the start image with the stored comparison image associated with each of the possible positions,
- determining a start assumption position of the elevator car based on the start comparison characteristic values and a start evaluation criterion;

the system performing a review phase including the steps of
- moving the elevator car along a review travel path from the unknown start position to a review position in the elevator shaft,
- taking a review image with the image capture unit at the review position of the elevator car in the elevator shaft,
- determining a review assumption position of the elevator car from the previous start assumption position of the elevator car and the review travel path,
- determining a review comparison characteristic value for the review assumption position of the elevator car, the review comparison characteristic value indicating a measure for a match of the review image with the stored comparison image associated with the review assumption position;

and the system performing a decision phase including making a decision, on the basis of the review comparison characteristic, whether to
- determine the review assumption position as the current position of the elevator car,
- carry out another one of the review phase and another one of the decision phase or,
- exclude the review assumption position as the current position of the elevator car; and the system transmitting the current position of the elevator car to the elevator control when the review assumption position is determined to be the current position of the elevator car.

2. The method according to claim 1 including in the decision phase, determining the review assumption position as the current position of the elevator car if the associated review characteristic value fulfills a predetermined decision determination criterion.

3. The method according to claim 2 wherein if the decision determination criterion is checked for more than one of the review assumption position, a review assumption position is only then determined as the current position of the elevator car if only the review comparison characteristic value associated with this review assumption position fulfills the decision determination criterion.

4. The method according to claim 2 wherein the review assumption position is determined as the current position of the elevator car only if at least one additional decision criterion that is independent of the review comparison characteristic value is fulfilled.

5. The method according to claim 4 wherein, as a decision criterion, including checking whether a travel path between the start position and the current review assumption position is greater than a predefined minimum travel path.

6. The method according to claim 1 including terminating the determination of the position of the elevator car if a predetermined termination criterion is fulfilled.

7. The method according to claim 6 including, as a termination criterion, checking whether an entire travel path of the elevator car, starting from the start position, has exceeded a predetermined maximum travel path.

8. The method according to claim 6 including restarting the determination of the position of the elevator car after a termination and moving the elevator car in an opposite direction in the review phase compared with the review phase before the termination.

9. The method according to claim 1 wherein, in the review phase, determining review comparison characteristic values for a region around the review assumption position of the elevator car and using the position belonging to the review comparison characteristic value indicating the greatest match as the review assumption position for the subsequent decision phase.

10. The method according to claim 1 including comparing the current image with the stored comparison image transversely to the direction of travel to determine the current position of the elevator car in the direction of travel.

11. The method according to claim 1 including determining the start comparison characteristic values by also comparing the start image with the stored comparison image transversely to the direction of travel and using the start comparison characteristic value, which indicates the greatest match of the start image with the stored comparison image of a position, as the start comparison characteristic value of the position.

12. The method according to claim 1 wherein, in order to determine the review comparison characteristic values, also comparing the review image with the stored comparison image transversely to the direction of travel and using the review comparison characteristic value which indicates the greatest match as the review comparison characteristic value for the subsequent decision phase.

13. The method according to claim 1 including, in the review phase, moving the elevator car at a lower speed in comparison with a normal operation speed of the elevator installation.

14. The method according to claim 1 including evaluating further information that can be acquired in the elevator shaft in order to determine the position of the elevator car.

15. A system for determining the position of an elevator car, the elevator car being movable in an elevator shaft of an elevator installation, comprising:

a computing unit;

an image capture unit arranged on the elevator car and taking images, consisting of individual pixels, of shaft components and/or shaft equipment serving other functions in the elevator installation and to transmit the images to the computing unit; and wherein the computing unit compares a current one of the images with at least one stored comparison image of the shaft components and/or shaft equipment in a direction of travel of the elevator car and determines a current position of the elevator car in the direction of travel by performing the following phases directly or indirectly, a start phase having the steps of taking a start image with the image capture unit when the elevator car is stationary at an unknown start position in the elevator shaft, determining a start comparison characteristic value for every possible position of the elevator car in the direction of travel, wherein the start comparison characteristic value indicates a measure for a match of the start image with a stored comparison image of one of the possible positions, determining a start assumption position of the elevator car on the basis of the start comparison characteristic values and a start evaluation criterion, a review phase having the steps of moving the elevator car along a review travel path to a review position in the elevator shaft, taking a review image with the image capture unit at the review position of the elevator car in the elevator shaft when the elevator car is stationary, determining a review assumption position of the elevator car from the previous start assumption position of the elevator car and the review travel path, determining a review comparison characteristic value for the review assumption position of the elevator car, the review comparison characteristic value indicating a measure for a match of the review image and with the stored comparison image of the review assumption position, and a decision phase in which a decision is made, on the basis of the review comparison characteristic, whether to determine the review assumption position as the current position of the elevator car, carry out a further review phase and a further decision phase, or exclude the review assumption position as the current position of the elevator car.

* * * * *